(12) United States Patent
Nishiwaki

(10) Patent No.: US 6,983,071 B2
(45) Date of Patent: Jan. 3, 2006

(54) CHARACTER SEGMENTATION DEVICE, CHARACTER SEGMENTATION METHOD USED THEREBY, AND PROGRAM THEREFOR

(75) Inventor: Daisuke Nishiwaki, Tokyo (JP)

(73) Assignee: NEC Corporation, Tokyo (JP)

( * ) Notice: Subject to any disclaimer, the term of this patent is extended or adjusted under 35 U.S.C. 154(b) by 615 days.

(21) Appl. No.: 10/145,525

(22) Filed: May 14, 2002

(65) Prior Publication Data
US 2002/0172422 A1 Nov. 21, 2002

(30) Foreign Application Priority Data
May 16, 2001 (JP) .............................. 2001-145740

(51) Int. Cl.
*G06K 9/34* (2006.01)
(52) U.S. Cl. ..................... 382/177; 382/254; 382/301
(58) Field of Classification Search ............... 382/173, 382/177, 175, 199, 203, 254, 260, 286, 288, 382/289, 301; 358/453, 415
See application file for complete search history.

(56) References Cited

U.S. PATENT DOCUMENTS

| 5,717,794 | A | * | 2/1998 | Koga et al. ................. 382/309 |
| 5,790,696 | A | * | 8/1998 | Takahashi ................... 382/177 |
| 6,035,061 | A | * | 3/2000 | Katsuyama et al. ......... 382/177 |
| 6,583,654 | B2 | * | 6/2003 | Kim et al. .................. 327/160 |

FOREIGN PATENT DOCUMENTS

| JP | H08-007031 A | 1/1996 |
| JP | H08-287184 A | 11/1996 |
| JP | 2000-207490 A | 7/2000 |
| JP | 2000-354150 A | 12/2000 |

OTHER PUBLICATIONS

Nishiwaki, et al., "A New Recognition Method of Black Ruled Line Form including Connected Handwritten Numerals", Institut National Polytechnique de Lorraine, GREC'97, Aug. 22-23, 1997, pp. 152-159.

* cited by examiner

*Primary Examiner*—Phuoc Tran
(74) *Attorney, Agent, or Firm*—Scully, Scott, Murphy & Presser

(57) ABSTRACT

Image size converter 4 converts the size of the image data stored in image input part 1 to an arbitrary size and stores the converted data. Image enhancer 5 uses the character frame design data stored in character frame information memory 3 to extract, from the image stored in image size converter 4, an image of a region containing character frames, and enhances and stores this extracted image. Image outline detector 6 forms an outline image from the image obtained by image enhancer 5. Character frame center detector 7 uses the outline image to detect the coordinates of the centers of the character frames of the input image data. Character frame remover 8 uses the character frame center coordinates and the character frame design data to remove the character frames, and outputs the result from character image output part 9.

30 Claims, 10 Drawing Sheets

CHARACTER SEGMENTATION DEVICE, CHARACTER SEGMENTATION METHOD USED THEREBY, AND PROGRAM THEREFOR

BACKGROUND OF THE INVENTION

1. Field of the Invention

The present invention relates to a character segmentation device, a character segmentation method used thereby, and a program therefor. It relates in particular to a character recognition device for automatically reading characters from input image data.

2. Description of Related Art

Known character recognition devices of this type include devices for reading names and addresses, product serial numbers, etc. that have been written inside frames on postal items or preprinted forms. These character recognition devices employ a character segmentation device for extracting characters written or printed in character entry frames (hereinafter termed simply "character frames") that have been preprinted in a color that will not vanish when an image of the region to be read is input. The configuration of a character segmentation device of this type is shown in FIG. 15.

The conventional character recognition device shown in FIG. 15 comprises image input part 21, character frame information input part 22, character frame detector 23, character frame information memory 24, character frame remover 25, character image output part 26 and controller 27.

For example, in the image processing device disclosed in JP 2000-354150 A, the means for detecting frames in the image data derived from a preprinted form comprises scanning the image in conjunction with a line memory, which is equivalent to extracting an image histogram, and identifying places where the histogram has a large cumulative value as corresponding to the position of a character frame. In this image processing device, the character frame removal means comprises extracting the image inside a character frame by using a masking unit to ignore those portions identified as corresponding to the character frame.

The use of a histogram for detecting character frames also features in the character frame detector disclosed in JP H08-007031 A and the image segmentation device and character recognition device disclosed in JP H08-287184 A. However, the use of a histogram sometimes results in erroneous detection of a character frame due to the influence of the character written or printed within the frame. This is mentioned in connection with the character segmentation device and character segmentation method disclosed in JP 2000-207490 A.

In the character segmentation device and character segmentation method disclosed in JP 2000-207490 A, the influence of characters is lessened by enhancing the histogram. However, if the character frame has a narrow line width or is printed faintly, the character frame image itself can end up being blurred if the image of the character frame in the input image is scanned at around 200 dots per inch.

A further problem encountered with the devices and methods mentioned above is erroneous detection of character frames when these frames are not present at sufficiently high quality in the input image. Moreover, because each character frame is detected in a single processing cycle without any alteration of the input size, given that there are cases in which the quality of a character frame is poor, it is not feasible to compress the image size in order to improve processing speed. As a result, the speed/performance ratio of these conventional devices and methods is poor.

SUMMARY OF THE INVENTION

It is therefore an object of the present invention to overcome the aforementioned problems and to provide a character segmentation device, a character segmentation method used thereby, and a program therefor, which are capable of significantly improving segmentation performance for characters on preprinted forms having character frames that have been preprinted in a color that will not vanish when an image of the region to be read is input.

A character segmentation device according to this invention removes character frames from an image containing said character frames, these frames having been preprinted in a color that will not vanish when an image of the region to be read is input, and outputs the resulting image from which the character frames have been removed. This character segmentation device comprises: image size conversion means for converting the size of the aforementioned image; image enhancement means for enhancing the image; and control means for controlling in such manner that, for poor quality images, the original image size is used and the image is enhanced by the aforementioned image enhancement means, while for good quality images, the image size is converted by the aforementioned image size conversion means.

A character segmentation method according to this invention removes character frames from an image containing said character frames, these frames having been preprinted in a color that will not vanish when an image of the region to be read is input, and outputs the resulting image from which the character frames have been removed. This character segmentation method comprises a first step of converting the size of the aforementioned image, and a second step of enhancing the image; and is adapted so that for poor quality images it uses the original image size and enhances the image, while for good quality images it converts the size of the image.

A program for implementing a character segmentation method according to this invention removes character frames from an image containing said character frames, these frames having been preprinted in a color that will not vanish when an image of the region to be read is input, and outputs the resulting image from which the character frames have been removed. This program for implementing a character segmentation method runs, on a computer, a first process of converting the size of the aforementioned image, a second process of enhancing the image, and a third process of controlling in such manner that for poor quality images the original image size is used and the image is enhanced, while for good quality images the size of the image is converted.

More specifically, a character segmentation device according to this invention provides, as novel items, image size conversion means for reducing the size of an input image, and image enhancement means for enhancing an input image. The present invention therefore realizes a character segmentation device with an excellent speed/performance ratio by using the original image size and enhancing the image in the case of poor quality images, while reducing the size of the input image in the case of good quality images.

In greater detail, a character segmentation device according to this invention comprises: an image input part to which is input the image of a preprinted form having character frames that have been preprinted in a color that will not vanish when an image of the region to be read is input, this image input part serving to store the preprinted form image as image data; a character frame information input part for inputting character frame design data; a character frame information memory for storing the character frame design data that have been input by the character frame information input part; an image size converter for converting the size of the image data stored in the image input part to an arbitrary size and storing the converted data; an image enhancer for using, the character frame design data stored in the character frame information memory to extract, from the image stored in the image size converter, an image of a region containing a character frame, and for enhancing and storing this extracted image; an image outline detector for forming an outline image from the image obtained by the image enhancer; a character frame center detector for using the outline image obtained by the image outline detector to detect the coordinates of the center of a character frame in the input image data; a character frame remover for using the character frame center coordinates obtained by the character frame center detector and the character frame design data stored in the character frame information memory to change—for the image of the region containing the character frame obtained by the image enhancer—the density value of pixels corresponding to the character frame to the same density value as the background pixels; a character image output part for outputting the image from which the character frame has been removed, this image having been obtained by the character frame remover; and a controller for controlling each of these operations.

If character frame detection fails, the aforementioned controller performs rapid, high-precision character segmentation by ceasing to use the reduced size image formed by the image size converter and at the same time using the image enhancer to enhance the image.

This facilitates significantly improved segmentation performance for characters on preprinted forms having character frames that have been preprinted in a color that will not vanish when an image of the region to be read is input.

In particular, by providing image size conversion means and image enhancement means and employing control means for using these in stepwise manner, and by performing character segmentation a plurality of times, segmentation of characters is possible when the character frame has a thin line width or is printed faintly, and even in situations where the quality deterioration of the input image is severe, as in the case of a facsimile device.

BRIEF DESCRIPTION OF THE DRAWINGS

Specific embodiments of the present invention will now be described, by way of example only, with reference to the accompanying of drawings in which:

FIG. 6 shows the results of character segmentation with the first embodiment;

DETAILED DESCRIPTION OF THE PREFERRED EMBODIMENTS

Figure 1:
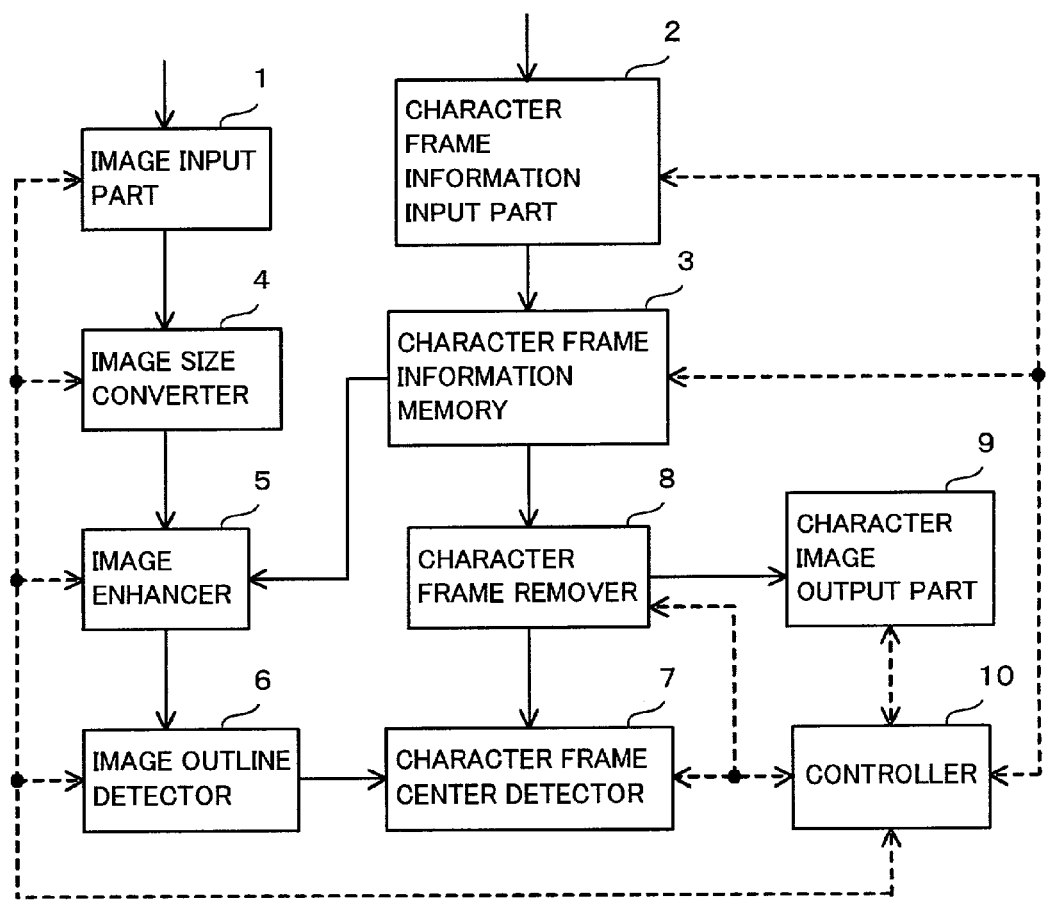
FIG. 1 is a block diagram showing the configuration of a character segmentation device according to a first embodiment of the present invention.

Embodiments of the present invention will now be described with reference to the drawings. FIG. 1 is a block diagram showing the configuration of a character segmentation device according to a first embodiment of this invention, in which the character segmentation device comprises image input part 1, character frame information input part 2, character frame information memory 3, image size converter 4, image enhancer 5, image outline detector 6, character frame center detector 7, character frame remover 8, character image output part 9, and controller 10.

Image input part 1 receives as input the image of a preprinted form having character entry frames (hereinafter, simply termed "character frames") that have been preprinted in a color that will not vanish when an image of the region to be read is input, and stores the preprinted form image as image data. Character frame information input part 2 inputs character frame design data. Character frame information memory 3 stores the character frame design data that have been input by character frame information input part 2.

Image size converter 4 converts the size of the image data stored in image input part 1 to an arbitrary size and stores the converted data. Image enhancer 5 uses the character frame design data stored in character frame information memory 3 to extract, from the image stored in image size converter 4, an image of a region containing a character frame, and enhances and stores this extracted image.

Image outline detector 6 forms an outline image from the image obtained by image enhancer 5. Character frame center detector 7 uses the outline image obtained by image outline detector 6 to detect the coordinates of the center of the character frame of the input image data.

Character frame remover 8 uses the character frame center coordinates obtained by character frame center detector 7 and the character frame design data stored in character frame information memory 3 to change—for the image of the region containing the character frame obtained by image enhancer 5—the density value of pixels corresponding to the character frame to the same density value as the background pixels. Character image output part 9 outputs the image from which the character frame has been removed, this image having been obtained by character frame remover 8.

Controller 10 controls the operations of each of image input part 1, character frame information input part 2, character frame information memory 3, image size converter 4, image enhancer 5, image outline detector 6, character frame center detector 7, character frame remover 8 and character image output part 9.

Figure 2:
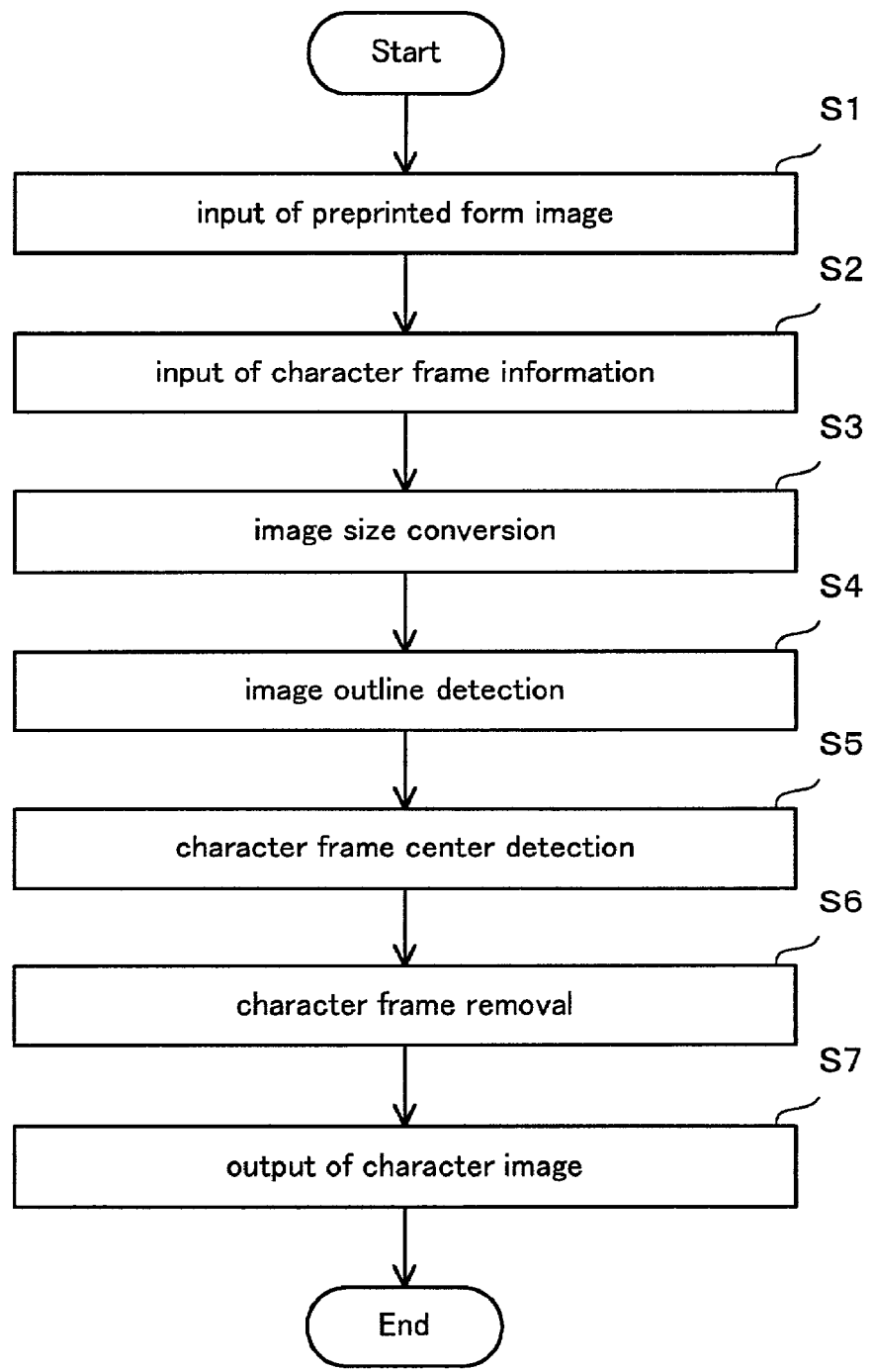
FIG. 2 is a flowchart showing the operation of the character segmentation device according to the first embodiment.
Figure 3:
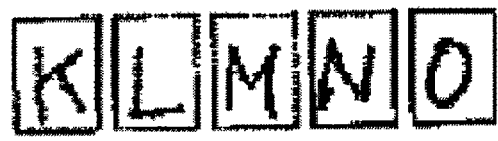
FIG. 3 shows examples of character frame images in an input image when using the first embodiment.
Figure 4:
FIG. 4 illustrates character outline extraction in the first embodiment.
Figure 5:
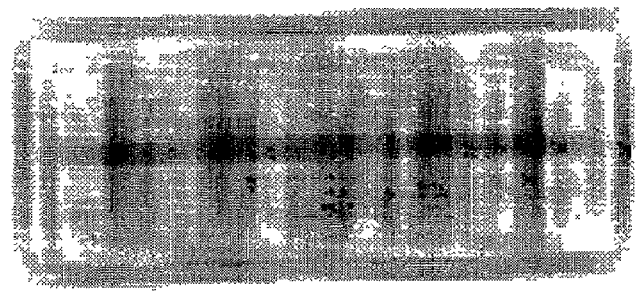
FIG. 5 illustrates character frame center detection in the first embodiment.

FIG. 2 is a flowchart showing the operation of the character segmentation device according to this first embodiment of the invention. FIG. 3 shows examples of character frame images in an input image when using this first embodiment. FIG. 4 illustrates character outline extraction in the first embodiment. FIG. 5 illustrates character frame center detection in the first embodiment. FIG. 6 shows the results of character segmentation with the first embodiment. The operation of a character segmentation device according to this first embodiment will be described with reference to FIGS. 1 to 6. The series of operations described below is implemented by controller 10 running a program.

Controller 10 controls the operations of each of image input part 1, character frame information input part 2, character frame information memory 3, image size converter 4, image enhancer 5, image outline detector 6, character frame center detector 7, character frame remover 8 and character image output part 9, and is preferably capable of starting each of these parts, monitoring its state, and inputting, storing and outputting process data. Controller 10 can be implemented for example on a computer.

An image of the preprinted form to be processed is converted to an electrical signal by a scanner, digital camera or facsimile device, and stored in image input part 1 (step S1 in FIG. 2). Image input part 1 can be implemented by means of an ordinary memory device of the sort used in computer equipment.

Information relating to the region over which character segmentation is to be carried out for the preprinted form to be processed is input from character frame information input part 2 (step S2 in FIG. 2). This region information comprises the position and size of the character frames and the type of character frame employed. This region information is used when specifying the position of character frames in the image stored in image input part 1. The various items of information are numerical data and are input via a keyboard or telephone line, or via the Internet.

The character frame information that has been input by way of character frame information input part 2 is stored in character frame information memory 3. Character frame information memory 3 can be implemented by means of an ordinary memory device of the sort used in computer equipment.

Image size converter 4 looks up the character frame information stored in character frame information memory 3 and extracts, from the preprinted form image stored in image input part 1, an image of the region in which character segmentation is to be performed, and reduces the size of that image (step S3 in FIG. 2). The image size reduction is a similar transformation of coordinates and can therefore be implemented by a computer program. A feasible size reduction method would for example be to halve the image size by compressing a 2×2 (vertical by horizontal) array of pixels, i.e. a total of four pixels, to a single pixel.

Specifically, this can be implemented by measuring the black/white value of each of the four pixels and applying the principle that these four pixels will be represented by a black pixel if there are two or more black pixels, and by a white pixel if there are fewer than two black pixels. It is also feasible to reduce size by an arbitrary factor. This could be done, for example, by multiplying the value of the coordinates of black pixels in the original image by the size reduction factor, and by taking as black pixels those pixels having the coordinates expressed by the values thus obtained.

Image outline detector 6 forms an outline image of the image obtained by size reduction of the image of the region containing the character frames (step S4 in FIG. 2). For example, let us assume that the image shown in FIG. 3 has been obtained as the size reduced image. If we use for example a differential filter on this image to detect boundaries where there is a large change in pixel value, an outline image of the sort shown in FIG. 4 is obtained. A Roberts filter or a Sobel filter can be used as the differential filter. In either case, the computation is performed for each regular region of 2×2 or 3×3 (vertical by horizontal) pixels, and can be implemented by a computer program.

Character frame center detector 7 uses the outline image formed by image outline detector 6 to obtain the coordinates of the centers of the character frames (step S5 in FIG. 2). It is feasible to use, as the method for obtaining these coordinates, the method that has been proposed by the present applicant (Nishiwaki et al.: A New Recognition Method of Black Ruled line Form including Connected Handwritten Numerals, Proc. of 2nd IAPR Workshop on Graphics Recognition, pp.152–159 (1997)), namely, detecting the center of each character frame by voting for where the center point of the character frame becomes maximum.

Performing this processing on the outline image, shown in FIG. 4 gives an image of the sort shown in FIG. 5, in which the centers of the cross-shaped intersections are obtained as the centers of the character frames. This method for obtaining the coordinates of the character frame centers can also be implemented as a computer program.

Character frame remover 8 removes just the character frames from the character frame image (step S6 in FIG. 2). Because the coordinates of the centers of the character frames have been found in step S5 described above, character frame remover 8 uses these coordinates and the character frame information stored in character frame information memory 3 to detect the inside edges of the character frames. Because these inside edges are detected as parts of the outline image, they can be easily detected using this outline image. This detection of the inside edges can be implemented as a computer program.

The reason why the inside edges are detected is that, if an attempt is made to detect the outline as soon as the outline image has been formed, and if many of the entered characters have strokes that are parallel to character frame lines, as depicted for example in FIG. 4, then the outlines of entered characters end up being mistaken for the outlines of character frames. However, if the inside edge of the character frames can be detected, it will be possible to remove the character frames by converting a region outside this inside edge—this region being a fixed number of pixels in width, corresponding to the line width of the character frames—to the value of the background, i.e., to white pixels. This removal of the character frames can also be implemented as a computer program. Removal of the character frames gives for example an image of the sort shown in FIG. 6.

Finally, character image output part 9 outputs an image from which the character frames have been removed, this image having been formed by character frame remover 8 (step S7 in FIG. 2). This image is usually output to a character recognizer (not illustrated), but can alternatively be output to a printer or facsimile device. Character image output part 9 can be implemented using the output device of a computer.

Removal of character frames can be accomplished in this way. However, in this embodiment, instead of removing character frames by means of the method described above, character frame remover 8 can alternatively extract the regions inside the inside edges of the character frames as soon as these inside edges have been detected. In this case, the extracted regions are the character images.

Figure 7:
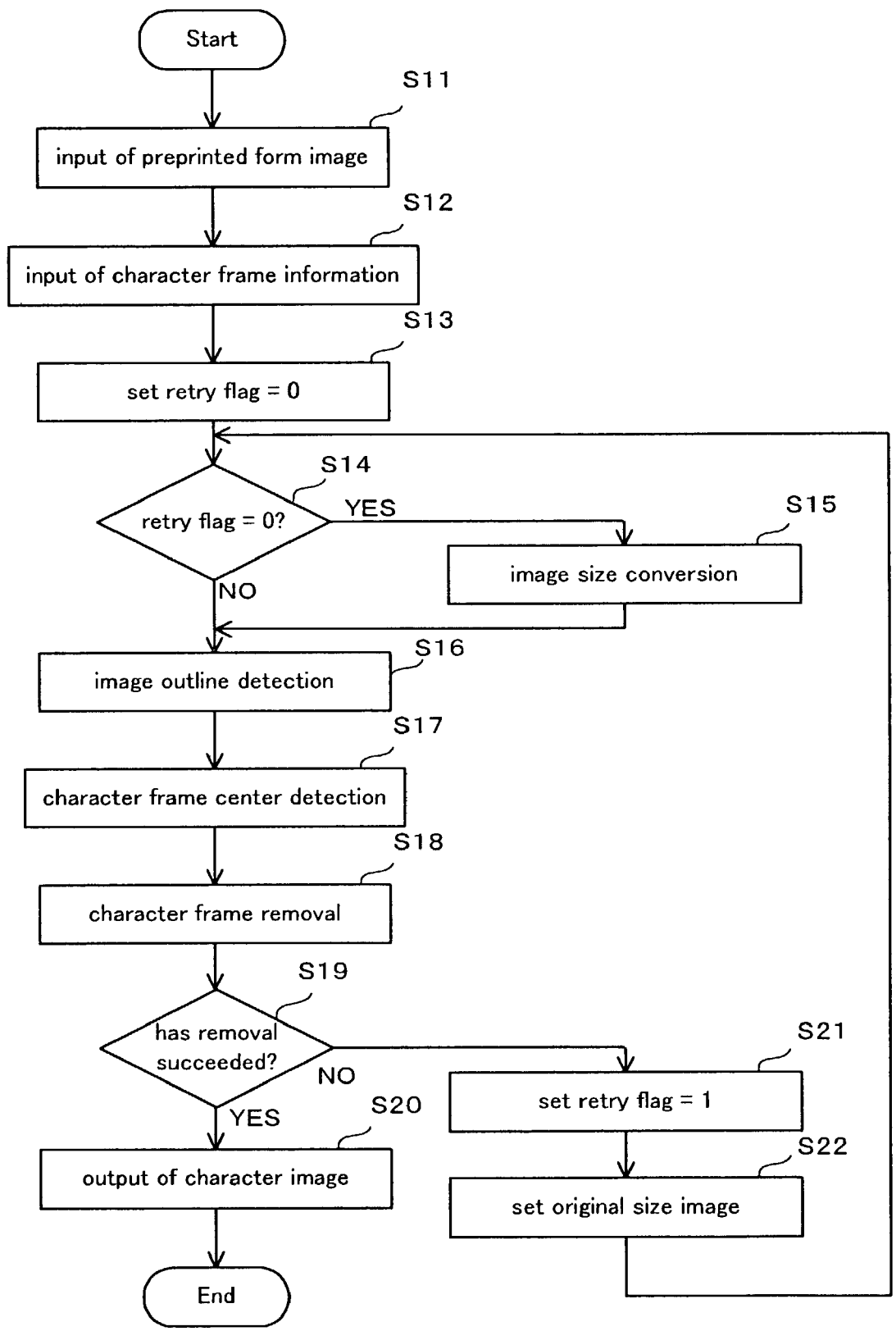
FIG. 7 is a flowchart showing the operation of a character segmentation device according to a second embodiment of the present invention.
Figure 8:
FIG. 8 shows an example in which the outlines of the character frames cannot be extracted in the case of a reduced size image resulting from size reduction of the image shown in FIG. 4.

FIG. 7 is a flowchart showing the operation of a character segmentation device according to a second embodiment of this invention. FIG. 8 shows an example in which the outlines of the character frames cannot be extracted in the case of a reduced size image resulting from size reduction of the image shown in FIG. 4. The operation of a character segmentation device according to this second embodiment will be described with reference to FIG. 7 and FIG. 8. It may be noted that because a character segmentation device according to this second embodiment has the same configuration as the character segmentation device of the first embodiment, shown in FIG. 1, its configuration need not be described here. It may also be noted that the series of operations described below is similar to those described above in that they can be implemented by controller 10 executing a program.

In the character segmentation device according to the above-described first embodiment of the invention, when the character frame images in the input image are small, or the character frame line width is fine, or the printing of the character frames is faint, it becomes impossible to extract the outline of the character frames if the image size is reduced by image size converter 4. An example of this is shown in FIG. 8, in which example the image size is small and the character frame outlines have partially disappeared due to the size reduction. Accordingly, in this second embodiment, character frame remover 8 confirms whether or not it has been possible to detect the character frames correctly.

The image of the preprinted form to be processed is converted to an electrical signal by a scanner, digital camera or facsimile device, and stored in image input part 1 (step S11 in FIG. 7). Information relating to the region over which character segmentation is to be carried out for the preprinted form to be processed is input from character frame information input part 2 (step S12 in FIG. 7). This region information is used when specifying the position of character frames in the image stored in image input part 1. The various items of information are numerical data and are input via a keyboard or telephone line, or via the Internet. The character frame information that has been input by way of character frame information input part 2 is stored in character frame information memory 3.

In this second embodiment, controller 10 records the number of processing cycles (step S13 in FIG. 7). Because controller 10 can be implemented as a computer program, this processing operation can be implemented by setting this number in a certain memory. Its initial value is set to "0" (zero). Hereinafter, this number of processing cycles will for convenience be called the "retry flag".

Controller 10 checks the retry flag that has been set (step S14 in FIG. 7). If the processing is in its first cycle, image size converter 4 looks up the character frame information stored in character frame information memory 3 and extracts, from the preprinted form image stored in image input part 1, an image of the region in which character segmentation is to be performed, and reduces the size of that image (step S15 in FIG. 7). This image size reduction is performed in the same manner as in the step S3 processing described previously.

Image outline detector 6 forms an outline image of the image obtained by size reduction of the image of the region containing the character frames (step S16 in FIG. 7). This outline image formation is performed in the same manner as in the step S4 processing described previously.

Character frame center detector 7 uses the outline image formed by image outline detector 6 to obtain the coordinates of the centers of the character frames (step S17 in FIG. 7). The method employed for obtaining these coordinates of the character frame centers can be the same method as in the step S5 processing described previously.

Character frame remover 8 removes just the character frames from the character frame image (step S18 in FIG. 7). Because the coordinates of the centers of the character frames have been found in step S17 described above, character frame remover 8 uses these coordinates and the character frame information stored in character frame information memory 3 to detect the inside edges of the character frames. Because these inside edges are detected as parts of the outline image, they can be easily detected using this outline image. However, if the inside edges cannot be detected, unsuccessful removal of character frames is confirmed (step S19 in FIG. 7).

If the inside edges of the character frames have been successfully detected, character image output part 9 outputs an image from which the character frames have been removed, this image having been formed by character frame remover 8 (step S20 in FIG. 7). If it is not possible to detect the inside edges of the character frames, controller 10 sets the retry flag to "1" (step S21 in FIG. 7), sets the original image, which has been stored in image size converter 4 (step S22 in FIG. 7), returns to step S14, and repeats the aforementioned processing.

Finally, character image output part 9 outputs an image from which the character frames have been removed, this image having been formed by character frame remover 8 (step S20 in FIG. 7). However, if at this point in the processing character frame remover 8 decides that it cannot detect the inside edges of the character frames after a second processing cycle, no character image is output.

It may be noted that in this second embodiment, like the first embodiment described above, instead of removing character frames by means of the method described above, character frame remover 8 can alternatively extract the regions inside the inside edges of the character frames as soon as these inside edges have been detected. In this case, the extracted regions are the character images.

Figure 9:
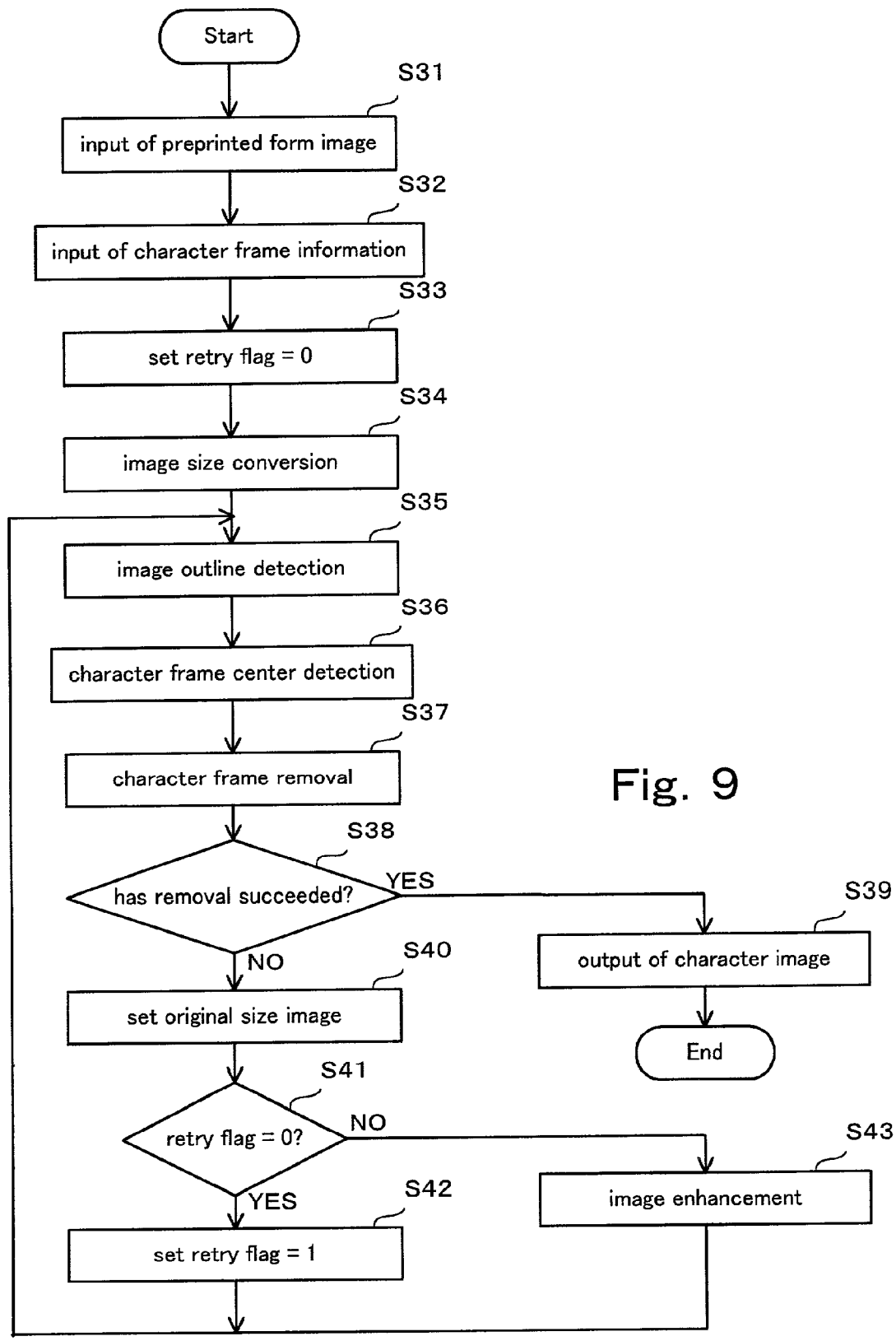
FIG. 9 is a flowchart showing the operation of a character segmentation device according to a third embodiment of the present invention.
Figure 10:
FIG. 10 shows an example of character frame images in an input image when using this third embodiment.
Figure 11:
FIG. 11 illustrates character outline extraction in this third embodiment.
Figure 12:
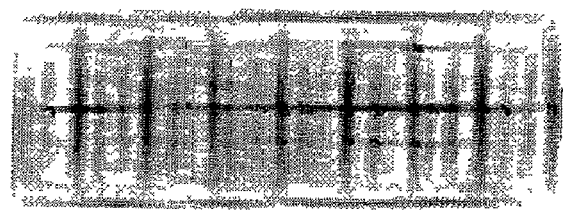
FIG. 12 illustrates character frame center detection in this third embodiment.
Figures 13, 14:
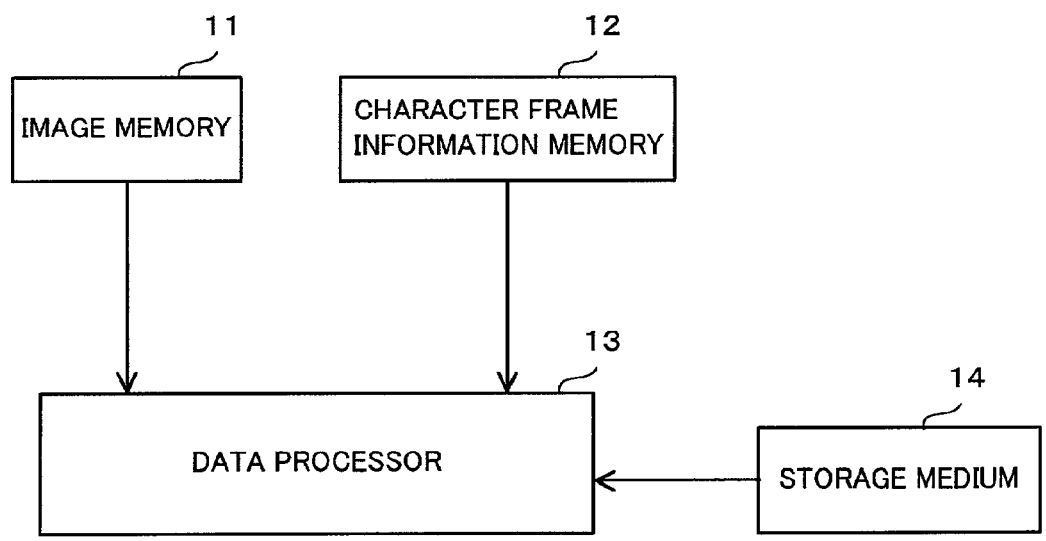
FIG. 13 shows the results of character segmentation in this third embodiment.
FIG. 14 is a block diagram showing the configuration of a character segmentation device according to a fourth embodiment of the present invention.
Figure 15:
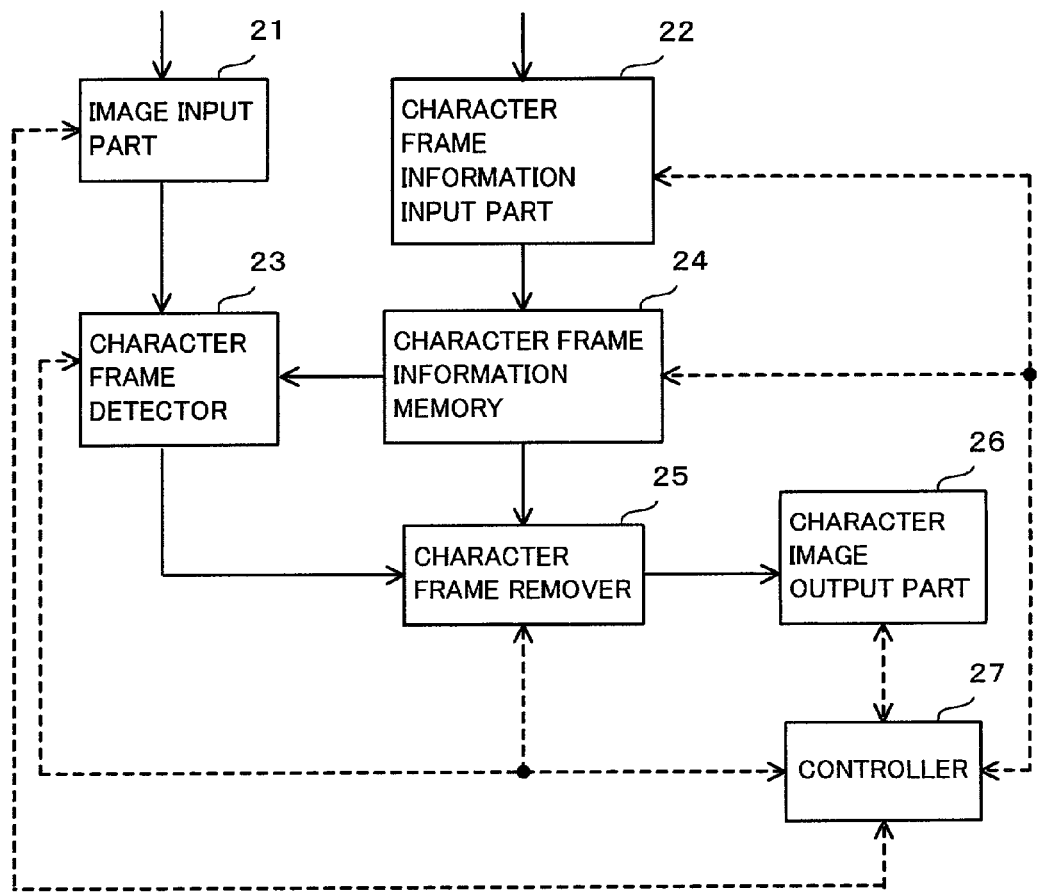
FIG. 15 is a block diagram showing the configuration of a conventional character segmentation device.

FIG. 9 is a flowchart showing the operation of a character segmentation device according to a third embodiment of this invention. FIG. 10 shows an example of character frame images in an input image when using this third embodiment. FIG. 11 illustrates character outline extraction in this third embodiment. FIG. 12 illustrates character frame center detection in this third embodiment. FIG. 13 shows the results of character segmentation in this third embodiment. The operation of a character segmentation device according to this third embodiment of the invention will be described with reference to FIGS. 9 to 13. It may be noted that because a character segmentation device according to this third embodiment has the same configuration as the character segmentation device according to the first embodiment, shown in FIG. 1, its configuration need not be described here. It may also be noted that the series of operations described below is similar to those described above in that they can be implemented by controller 10 executing a program.

In the second embodiment of this invention, if a character frame could not be detected by the first processing cycle, a second processing cycle was performed using the original size image. However, in some cases it is not image size that is the problem, but rather that the image itself is blurred. In such a case, the image is enhanced by image enhancer 5 to facilitate detection of the character frame.

The image of the preprinted form to be processed is converted to an electrical signal by a scanner, digital camera or facsimile device, and stored in image input part 1 (step S31 in FIG. 9). Information relating to the region over which character segmentation is to be carried out for the preprinted form to be processed is input from character frame information input part 2 (step S32 in FIG. 9). This region information is used when specifying the position of character frames in the image stored in image input part 1. The various items of information are numerical data and are input via a keyboard or telephone line, or via the Internet. The character frame information that has been input by way of character frame information input part 2 is stored in character frame information memory 3.

In this third embodiment, controller 10 records the number of processing cycles (the "retry flag") (step S33 in FIG. 9). Because controller 10 can be implemented as a computer program, this processing operation can be implemented by setting this number in a certain memory. Its initial value is set to "0" (zero).

Image size converter 4 looks up the character frame information stored in character frame information memory 3 and extracts, from the preprinted form image stored in image input part 1, an image of the region in which character segmentation is to be performed, and reduces the size of that image (step S34 in FIG. 9). This image size reduction is performed in the same manner as in the step S3 processing described previously.

Image outline detector 6 forms an outline image of the image obtained by size reduction of the image of the region containing the character frames (step S35 in FIG. 9). This outline image formation is performed in the same manner as in the step S4 processing described previously.

Character frame center detector 7 uses the outline image formed by image outline detector 6 to obtain the coordinates of the centers of the character frames (step S36 in FIG. 9). The method employed for obtaining these coordinates of the character frame centers can be the same method as in the step S5 processing described previously.

Character frame remover 8 removes just the character frames from the character frame image (step S37 in FIG. 9). Because the coordinates of the centers of the character frames have been found in step S36 described above, character frame remover 8 uses these coordinates and the character frame information stored in character frame information memory 3 to detect the inside edges of the character frames. Because these inside edges are detected as parts of the outline image, they can be easily detected using this outline image. However, if the inside edges cannot be detected, unsuccessful removal of character frames is confirmed (step S38 in FIG. 9).

If the inside edges of the character frames have been successfully detected, character image output part 9 outputs an image from which the character frames have been removed, this image having been formed by character frame remover 8 (step S39 in FIG. 9). If it is not possible to detect the inside edges of the character frames, the original image, which has been stored in image size converter 4, is set (step S40 in FIG. 9).

Controller 10 checks the retry flag (step S41 in FIG. 9). If the retry flag is "0", controller 10 changes it to "1" (step S42 in FIG. 9), returns to step S35, and repeats the aforementioned processing.

If the retry flag is "1", image enhancer 5 enhances the image (step S43 in FIG. 9). The image enhancement can be implemented by for example changing all the eight pixels immediately surrounding a black pixel in the image to black pixels. Alternatively, it can be implemented by forming a mask comprising either three vertical pixels or three horizontal pixels, and then making the center pixel of the mask a black pixel if the two pixels immediately above and below the vertical mask or to the left and right of the horizontal mask are both black. These image enhancement methods can be implemented as computer programs. An example of an image after enhancement is shown in FIG. 10.

The processing operations of aforementioned step S35 and subsequent steps are repeated, and character image output part 9 finally outputs an image from which the character frames have been removed, this image having been formed by character frame remover 8 (step S39 in FIG. 9). The images shown in FIG. 11 and FIG. 12 are examples of the images obtained when step S35 and step S36 respectively have been performed. FIG. 13 shows the image obtained after removal of character frames. However, if at this point in the processing character frame remover 8 decides that it cannot detect the character frames after a third processing cycle, it halts the processing and no character image is output.

It may be noted that in this third embodiment, like the first and second embodiments of the invention, instead of removing character frames by means of the method described above, character frame remover 8 can alternatively extract the regions inside the inside edges of the character frames as soon as these inside edges have been detected. In this case, the extracted regions are the character images.

FIG. 14 is a block diagram showing the configuration of a character segmentation device according to a fourth embodiment of the present invention. In FIG. 14, the character segmentation device comprises image memory 11, character frame information memory 12, data processor 13, and storage medium 14 in which a character segmentation program has been stored.

Data processor 13 can be an ordinary computer. Image memory 11 and character frame information memory 12 can be implemented by the main storage in data processor 13 or by external storage.

Storage medium 14 can be a magnetic or magneto-optic storage medium such as CD-ROM (compact disc read-only memory), DVD-ROM (digital versatile disc read-only memory), DVD-RAM (digital versatile disc random access memory) or the like; or it can be a semiconductor memory or the like. Storage medium 14 can also encompass distribution via a network.

The character segmentation program is written from storage medium 14 to data processor 13, which runs the program. Running this character segmentation program results in a series of operations, such as that shown in FIG. 2, being performed. The operation of the character segmentation program will now be described with reference to FIG. 2 and FIG. 14.

Using the character segmentation program, data processor 13 first of all converts an image to an electrical signal by means of a scanner, digital camera or facsimile device, and stores this as the image data (step S1 in FIG. 2). Data processor 13 also reads, from character frame information memory 12, information relating to the region over which character segmentation is to be carried out for the preprinted form to be processed, and stores this information (step S2 in FIG. 2).

After this, data processor 13 extracts, using the stored image of the preprinted form and the character frame information, an image of the region in which character segmentation is to be performed, and reduces the size of that image (step S3 in FIG. 2). The image size reduction is a similar transformation of coordinates and therefore can be implemented by a computer program.

A feasible size reduction method would for example be to halve the image size by compressing a 2×2 (vertical by horizontal) array of pixels, i.e. a total of four pixels, to a single pixel. Specifically, this can be implemented by measuring the black/white value of each of the four pixels and applying the principle that these four pixels will be represented by a black pixel if there are two or more black pixels, and by a white pixel if there are fewer than two black pixels. It is also feasible to reduce size by an arbitrary factor. This could be done, for example, by multiplying the value of the coordinates of black pixels in the original image by the size reduction factor, and by taking as black pixels those pixels having the coordinates expressed by the values thus obtained.

Data processor 13 forms an outline image of the image obtained by size reduction of the image of the region containing the character frames (step S4 in FIG. 2). A Roberts filter or Sobel filter can be used as a differential filter for the formation of this outline image. In either case, the computation is performed for each regular region of 2×2 or 3×3 (vertical by horizontal) pixels, and can be implemented by a computer program.

Data processor 13 uses the formed outline image to obtain the coordinates of the centers of the character frames (step S5 in FIG. 2). It is feasible to use, as the method for obtaining these coordinates, a method similar to the step S5 processing described above.

After this, data processor 13 removes just the character frames from the character frame image (step S6 in FIG. 2). Because the coordinates of the centers of the character frames have been found in step S5 described above, data processor 13 uses its internally stored character frame information to detect the inside edges of the character frames. Because these inside edges are detected as parts of the outline image, they can be easily detected using this outline image. This detection of the inside edges can be implemented as a computer program.

Finally, data processor 13 outputs an image from which the character frames have been removed (step S7 in FIG. 2). This image is usually output to a character recognizer (not illustrated), but can alternatively be output to a printer or facsimile device. The output of the image from which the character frames have been removed can be implemented using the output device of the computer.

It may be noted that this fourth embodiment was described in terms of a character segmentation program performing the series of operations shown in FIG. 2. However, it would also be feasible for it to perform the series of operations depicted in FIG. 7 or FIG. 9, nor is it restricted to this.

It is thus possible to significantly improve segmentation performance for characters on preprinted forms having character frames that have been preprinted in a color that will not vanish when an image of the region to be read is input. In particular, by adding image size converter 4 and image enhancer 5 to the device configuration, and by having controller 10 which uses these means in step-wise fashion, multi-step character segmentation is performed, and hence character segmentation is possible even when the character frames have a narrow line width or are printed faintly, and even in situations such as facsimile where there is severe degradation of input image quality.

As has been described above, this invention provides, as novel items, image size conversion means for reducing the size of an input image, and image enhancement means for enhancing an input image, so that the original image size is used and this image is enhanced in the case of poor quality images, while the size of the input image is reduced in the case of good quality images. The invention consequently has the advantage of significantly improving segmentation performance for characters on preprinted forms having character frames preprinted in a color that will not vanish when an image of the region to be read is input.

What is claimed is:

1. A character segmentation device for removing character frames from an image containing said character frames, these frames having been preprinted in a color that will not vanish when an image of a region to be read is input, and for outputting a resulting image from which the character frames have been removed; said character segmentation device comprising:
   image size conversion means for converting the size of said image;
   image enhancement means for enhancing said image; and
   control means for controlling in such manner that, for poor quality images, the original image size is used and the image is enhanced by said image enhancement means, while for good quality images, the image size is converted by said image size conversion means.

2. A character segmentation device as recited in claim 1, wherein said image size conversion means is configured to convert the size of said image to an arbitrary size, and to store the converted image.

3. A character segmentation device as recited in claim 1, wherein said image enhancement means is configured to use design data of said character frames to extract, from a image stored in said image size conversion means, an image of a region containing said character frames, and to enhance and store this image.

4. A character segmentation device as recited in claim 1, comprising:
   image outline detection means for forming an outline image from the image obtained by said image enhancement means;
   character frame center detection means for using the outline image obtained by said image outline detection means to detect the coordinates of the centers of said character frames;
   character frame removal means for using the character frame center coordinates obtained by said character frame center detection means, and a character frame design data, to remove said character frames; and
   character image output part for outputting the image from which said character frames have been removed, this image having been obtained by said character frame removal means.

5. A character segmentation device as recited in claim 4, wherein said character frame removal means is configured to use the character frame center coordinates obtained by said character frame center detection means, and said character frame design data, to change—for an image of the region containing the character frames obtained by said image enhancement means—the density value of pixels corresponding to said character frames to the same density value as the background pixels.

6. A character segmentation device as recited in claim 4, wherein said character frame removal means is configured to use the character frame center coordinates obtained by said character frame center detection means, and said character frame design data, to extract—for an image of the region containing the character frames obtained by said image enhancement means, and for each character frame—the region within said character frames.

7. A character segmentation device as recited in claim 1, wherein said image size conversion means is configured to store the original image at the same time as it converts said image to an arbitrary size and stores the converted image.

8. A character segmentation device as recited in claim 1, wherein said image enhancement means is configured to use a character frame design data to extract, from the image stored in said image size conversion means, an image of a region containing said character frames, and to enhance and store this image; and at the same time to store also the image prior to enhancement.

9. A character segmentation device as recited in claim 1, wherein said image enhancement means is adapted to use, for said image enhancing, an arbitrary filter suitable for a 3×3 (vertical by horizontal) pixel array.

10. A character segmentation device as recited in claim 4, wherein said character frame removal means is configured so that, when said character frame has not been detected, it performs character frame removal again using the original image.

11. A character segmentation device as recited in claim 4, wherein said character frame removal means is configured so that, when a said character frame has not been detected, it performs character frame removal again using the image obtained by said enhancing.

12. A character segmentation device as recited in claim 4, wherein said character frame center detection means is configured to take, as the center of a character frame, that pixel among the pixels in the estimated central region of said character frame, for which the sum of the distances to the black pixels present in the corresponding character frame region is maximum.

13. A character segmentation method for removing character frames from an image containing said character frames, these frames having been preprinted in a color that will not vanish when an image of a region to be read is input, and for outputting a resulting image from which the character frames have been removed; said character segmentation method comprising:
a first step of converting the size of said image; and
a second step of enhancing said image;
and being adapted so that for poor quality images the original image size is used and said image is enhanced, while for good quality images the size of said image is converted.

14. A character segmentation method as recited in claim 13, wherein said first step is adapted to convert the size of said image to an arbitrary size, and to store the converted image.

15. A character segmentation method as recited in claim 13, wherein said second step is adapted to use design data of said character frames to extract, from said image, an image of a region containing said character frames, and to enhance and store this image.

16. A character segmentation method as recited in claim 13, comprising:
a third step of forming an outline image from the image enhanced in said second step;
a fourth step of using this outline image to detect the coordinates of the centers of said character frames;
a fifth step of using the detected character frame center coordinates and a character frame design data to remove said character frames; and
a sixth step of outputting the image from which these character frames have been removed.

17. A character segmentation method as recited in claim 16, wherein said fifth step is adapted to use the character frame center coordinates obtained in said fourth step and said character frame design data to change—for an image of the region containing the character frames obtained in said second step—the density value of pixels corresponding to said character frames to the same density value as the background pixels.

18. A character segmentation method as recited in claim 16, wherein said fifth step is adapted to use the character frame center coordinates obtained in said fourth step and said character frame design data to extract—for an image of the region containing the character frames obtained in said second step and for each character frame—the region within said character frame.

19. A character segmentation method as recited in claim 13, wherein said first step is adapted to store the original image at the same time as it converts said image to an arbitrary size and stores the converted image.

20. A character segmentation method as recited in claim 13, wherein said second step is adapted to use a character frame design data to extract, from an image stored in said second step, an image of a region containing said character frames, and to enhance and store this image; and at the same time to store also the image prior to enhancement.

21. A character segmentation method as recited in claim 13, wherein said second step is adapted to use, for said image enhancing, an arbitrary filter suitable for a 3×3 (vertical by horizontal) pixel array.

22. A character segmentation method as recited in claim 16, wherein said fifth step is adapted so that, when said character frame has not been detected, it performs character frame removal again using the original image.

23. A character segmentation method as recited in claim 16, wherein said fifth step is adapted so that, when said character frame has not been detected, it performs character frame removal again using the image obtained by said enhancement.

24. A character segmentation method as recited in claim 16, wherein said fourth step is adapted to take, as the center of a character frame, that pixel among the pixels in the estimated central region of said character frame, for which the sum of the distances to the black pixels present in the corresponding character frame region is maximum.

25. A program embodied in a computer readable medium for a character segmentation method for removing character frames from an image containing said character frames, these frames having been preprinted in a color that will not vanish when an image of a region to be read is input, and for outputting a resulting image from which the character frames have been removed; said program executing, in a computer:
a first process of converting the size of said image;
a second process of enhancing said image; and
a third process of controlling in such manner that, for poor quality images, the original image size is used and said image is enhanced, while for good quality images, the size of said image is converted.

26. A program as recited in claim 25 and adapted so that, in said computer, as said first process, the size of said image is converted to an arbitrary size, and the converted image is stored.

27. A program as recited in claim 25 and adapted so that, in said computer, as said second process, design data of said character frames is used to extract, from said image, an image of a region containing said character frames, and this image is enhanced and stored.

28. A program as recited in claim 25, said program serving to execute, in said computer:
- a third process for forming an outline image from the image enhanced in said second process;
- a fourth process for using this outline image to detect the coordinates of the centers of said character frames;
- a fifth process for using these detected character frame center coordinates and a character frame design data to remove said character frames; and
- a sixth process for outputting the image from which the character frames have been removed.

29. A program as recited in claim 28 and adapted so that, in said computer, as said fifth process, it uses the character frame center coordinates obtained by said fourth process and said character frame design data to change—for an image of the region containing the character frames obtained by said second process—the density value of pixels corresponding to said character frames to the same density value as the background pixels.

30. A program as recited in claim 28 and adapted so that, in said computer, as said fifth process, it uses the character frame center coordinates obtained by said fourth process and said character frame design data to extract—for an image of the region containing the character frames obtained by said second process, and for each character frame—the region within said character frames.

\* \* \* \* \*